US011913631B2

(12) United States Patent
Lee

(10) Patent No.: US 11,913,631 B2
(45) Date of Patent: *Feb. 27, 2024

(54) COOKTOP AND KNOB ASSEMBLY THEREOF

(71) Applicant: LG ELECTRONICS INC., Seoul (KR)

(72) Inventor: Dae Yong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,698

(22) Filed: Jan. 19, 2023

(65) Prior Publication Data

US 2023/0160569 A1 May 25, 2023

Related U.S. Application Data

(63) Continuation of application No. 17/460,642, filed on Aug. 30, 2021, now Pat. No. 11,608,978.

(30) Foreign Application Priority Data

Aug. 28, 2020 (KR) ........................ 10-2020-0109648

(51) Int. Cl.
*F21V 3/00* (2015.01)
*F21V 3/02* (2006.01)
(Continued)

(52) U.S. Cl.
CPC ............ *F21V 33/0044* (2013.01); *F21V 3/02* (2013.01); *F24C 3/126* (2013.01); *F24C 7/082* (2013.01); *G05G 1/105* (2013.01)

(58) Field of Classification Search
CPC ........ F21V 33/0044; F21V 3/02; F24C 3/126; F24C 7/082; F24C 7/083; F24C 3/124;
(Continued)

(56) References Cited

U.S. PATENT DOCUMENTS 6,224,221 B1 5/2001 Glienicke
6,334,688 B1 1/2002 Niwa
(Continued)

FOREIGN PATENT DOCUMENTS

CN 1839280 A 9/2006
CN 201016484 Y 2/2008
(Continued)

OTHER PUBLICATIONS

Notice of Allowance in Chinese Appln. No. 202111003198.5, dated Apr. 27, 2023, 20 pages (with English translation).

*Primary Examiner* — Peggy A Neils
(74) *Attorney, Agent, or Firm* — Fish & Richardson P.C.

(57) ABSTRACT

A cooktop includes a knob assembly controls a heating part. The knob assembly includes: a knob body disposed at a front surface of a control panel and rotating around a rotation shaft extended in a front-rear direction, a light diffusing part disposed at a rear side of the knob body and diffusing light, and a light source part disposed at a rear side of the light diffusing part and including one or more light sources. The light diffusing part includes a light source corresponding part disposed at a position corresponding to one of the light sources, and a thickness of the light diffusing part along a first straight line that passes from a center of the light diffusing part through the light source corresponding part is greater than a thickness of the light diffusing part along a straight line that does not pass through the light source corresponding part.

13 Claims, 16 Drawing Sheets

(51) Int. Cl.

| | |
|---|---|
| ***F24C 3/12*** | (2006.01) |
| ***F24C 7/08*** | (2006.01) |
| ***G05G 1/10*** | (2006.01) |
| ***F21V 33/00*** | (2006.01) |

(58) Field of Classification Search

CPC .... G05G 1/105; G02B 6/0051; H01H 19/025; H01H 2219/056; H01H 2219/062; H01H 2219/0622; H01H 19/14

See application file for complete search history.

(56) References Cited

U.S. PATENT DOCUMENTS

| | | | | |
|---|---|---|---|---|
| 7,222,979 | B1 | 5/2007 | Popowich et al. | |
| 10,345,514 | B2 | 7/2019 | Kozinski et al. | |
| 10,458,656 | B2 | 10/2019 | Jung et al. | |
| 10,890,331 | B2 | 1/2021 | Kim | |
| 11,608,978 | B2 * | 3/2023 | Lee | G05G 1/105 |
| 2011/0209974 | A1 | 9/2011 | Yuasa | |
| 2014/0056022 | A1 | 2/2014 | Camli et al. | |
| 2017/0227231 | A1 | 8/2017 | Pionek et al. | |
| 2018/0238556 | A1 | 8/2018 | Kozinski et al. | |

FOREIGN PATENT DOCUMENTS

| | | | |
|---|---|---|---|
| CN | 102246253 | A | 11/2011 |
| CN | 106989358 | A | 7/2017 |
| CN | 207623831 | U | 7/2018 |
| CN | 109563998 | A | 4/2019 |
| CN | 111061334 | A | 4/2020 |
| KR | 20170079067 | | 7/2017 |

* cited by examiner

--Prior Art--

--Prior Art--

--Prior Art--

100

COOKTOP AND KNOB ASSEMBLY THEREOF

CROSS-REFERENCE TO RELATED APPLICATION

This application is a continuation application of U.S. application Ser. No. 17/460,642, filed on Aug. 30, 2021, which claims the benefit of the earlier filing date and the right of priority to Korean Patent Application No. 10-2020-0109648, filed on Aug. 28, 2020, the contents of which are hereby incorporated by reference in their entirety.

TECHNICAL FIELD

The present disclose relates to a cooktop and a knob assembly of the cooktop, and more particularly, a knob assembly and a cooktop including the same that are capable of emitting light around a knob to enhance user recognition of operation of a product.

BACKGROUND

Cooktops that heat target objects use gas or electricity to heat the target objects. The cooktops can include a knob that rotates around a shaft to adjust an amount of heat applied to a target objector to manipulate the cooktop such as the setting of a cooking mode and the like.

A conventional cooktop includes knobs (or switches) around which light is emitted to improve visibility.

FIGS. 1 and 2 are diagrams illustrating a switch assembly in the conventional cooktop.

The switch assembly of the conventional cooktop can include a switch 1, a light guide 2, a switch holder 3, a control panel 4, a support bracket 5, and a regulator 6.

The light guide 2 includes a light guide path 2-1 and an LED module 2-2. The LED module 2-2 is disposed at a first end of the light guide path 2-1. Since the LED module 2-2 as a light source is disposed at the first end of the light guide path 2-1, constant brightness of light cannot be ensured. For example, the first end of the light guide path 2-1, at which the LED module 2-2 is disposed, is relatively bright, while a second end on the opposite side of the first end is relatively dark.

FIG. 3 is a diagram illustrating a portion of a knob assembly of another conventional cooktop.

The knob assembly in the another conventional cooktop includes a first light guide 7, a second light guide 8, and a bezel main body 9. The second light guide 8 includes a leg 8-1 extended toward a light source, and a guide ring 8-2 forming a diffused light. In the another conventional cooktop, the light source is disposed in an end portion of the leg 8-1. Accordingly, a portion of the guide ring 8-2, which contacts the leg 8-1, is relatively bright, while a portion far from the portion in contact with the leg 8-1 is relatively dark.

SUMMARY

The present disclosure is directed to a cooktop and a knob assembly that can enhance recognizing of operations of the cooktop.

Further, the present disclosure is directed to a cooktop and a knob assembly that can emit light uniformly around a knob.

Moreover, the present disclosure is directed to a cooktop and a knob assembly that can improve aesthetic qualities.

According to one aspect of the subject matter described in this application, a cooktop can include a heating part configured to heat a target object, and a manipulating part comprising (i) a control panel and (ii) a knob assembly that is coupled to the control panel and that is configured to control the heating part. The knob assembly can include a knob body that is disposed at a front surface of the control panel and that is configured to rotate with respect to a rotation shaft extended in a front-rear direction, a light diffusing part that is disposed at a rear side of the knob body and that is configured to diffuse light, and a light source part that is disposed at a rear side of the light diffusing part and that includes one or more light sources. The light diffusing part can include a light source corresponding part that is disposed at a position corresponding to one of the one or more light sources. A thickness of the light diffusing part along a first straight line that passes from a center of the light diffusing part through the light source corresponding part can be greater than a thickness of the light diffusing part along a straight line that does not pass through the light source corresponding part.

Implementations according to this aspect can include one or more of the following features. For example, the thickness of the light diffusing part along the first straight line can increase from the center of the light diffusing part toward an outer edge of the light diffusing part.

In some implementations, a thickness of the light diffusing part on a circumference of a first circle can decrease from an intersection point between the first circle and the first straight line toward an outer edge of the light diffusing part. In some implementations, the light diffusing part can include a plate having a thickness that increases from a center of the plate toward an outer edge of the plate along the first straight line, and a ring that surrounds the outer edge of the plate, that protrudes forward from the plate, and that has a diameter greater than a diameter of the knob body.

In some examples, a portion of the knob body can be inserted into a space defined by the plate and the ring. In some implementations, the cooktop can further include a knob ring that is disposed between the light diffusing part and the light source part, that is coupled to a front surface of the control panel, and that defines an exterior of the knob assembly.

In some implementations, the light diffusing part can include one or more first coupling hooks protruding rearward, and the knob ring can include one or more first connecting holes fitted-coupled to the one or more first coupling hooks. In some examples, the knob ring can include a plate having at least one of the one or more first connecting holes, and a ring that surrounds an outer edge of the plate, that protrudes forward from the plate, and that has a diameter greater than a diameter of the light diffusing part.

In some examples, the light diffusing part can be inserted into a space defined by the plate and the ring. In some implementations, the knob ring can include one or more second connecting hooks protruding rearward and to which the light source part is fitted-coupled.

In some implementations, a maximum thickness of the light diffusing part along the first straight line can be 1.5 times thicker than a minimum thickness of the light diffusing part. In some implementations, the light source part can include a plurality of light sources, and a thickness of the light diffusing part along a second straight line that passes from the center of the light diffusing part through an intermediate point between two adjacent light sources of the light diffusing part can be less than a thickness of the light diffusing part along a straight line that does not pass through the intermediate point.

In some examples, the thickness of the light diffusing part along the second straight line can remain constant from the center of the light diffusing part toward an outer edge of the light diffusing part. In some examples, an outermost thickness of the light diffusing part along the first straight line can be 1.5 times greater than a thickness of the light diffusing part along the second straight line.

In some implementations, the plurality of light sources can be spaced at regular intervals.

According to another aspect of the subject matter described in this application, a knob assembly can include a knob body configured to rotate with respect to a rotation shaft extended in a front-rear direction, a light diffusing part that is disposed at a rear side of the knob body and that is configured to diffuse light, and a light source part that is disposed at a rear side of the light diffusing part and that includes one or more light sources. The light diffusing part can include a light source corresponding part that is disposed at a position corresponding to one of the one or more light sources. A thickness of the light diffusing part along a first straight line that passes from a center of the light diffusing part through the light source corresponding part can be greater than a thickness of the light diffusing part along a straight line that does not pass through the light source corresponding part.

Implementations according to this aspect can include one or more following features. For example, the thickness of the light diffusing part along the first straight line can increase from the center of the light diffusing part toward an outer edge of the light diffusing part.

In some implementations, a thickness of the light diffusing part on a circumference of a first circle can decrease from an intersection between the first circle and the first straight line toward an outer edge of the light diffusing part. In some implementations, the light diffusing part can include a plate having a thickness that increases from a center of the plate toward an outer edge of the plate along the first straight line, and a ring that surrounds the outer edge of the plate, that protrudes forward from the plate, and that has a diameter greater than a diameter of the knob body. A portion of the knob body can be inserted into a space defined by the plate and the ring.

In some implementations, the knob assembly can further include a knob ring that is disposed between the light diffusing part and the light source part and that defines an exterior of the knob assembly. The light diffusing part and the knob ring can be fitted-coupled.

A cooktop and a knob assembly of the cooktop can include a light diffusing part capable of efficiently diffusing light, irradiated from a light source part, around a knob, thereby enhancing recognizing operations of the cooktop and ensuring improvement in user convenience.

Light irradiated to the light diffusing part can be diffused further toward a relatively thick portion of the light diffusing part. In the knob assembly and the cooktop provided with the same, since a thickness of the light diffusing part can increase toward an outer edge thereof, the light irradiated to the light diffusing part can be efficiently diffused to the outer edge of the light diffusing part. Thus, a brighter light can be emitted in an outer edge area of the light diffusing part, and uniform brightness can be ensured entirely in the outer edge area of the light diffusing part, thereby improving aesthetic qualities and enabling a user to recognize operations of the cooktop more conveniently.

Additionally, damage caused by a twist of the light source part can be limited, and the light source part can be readily assembled and replaced.

DETAILED DESCRIPTION

Figure 1:
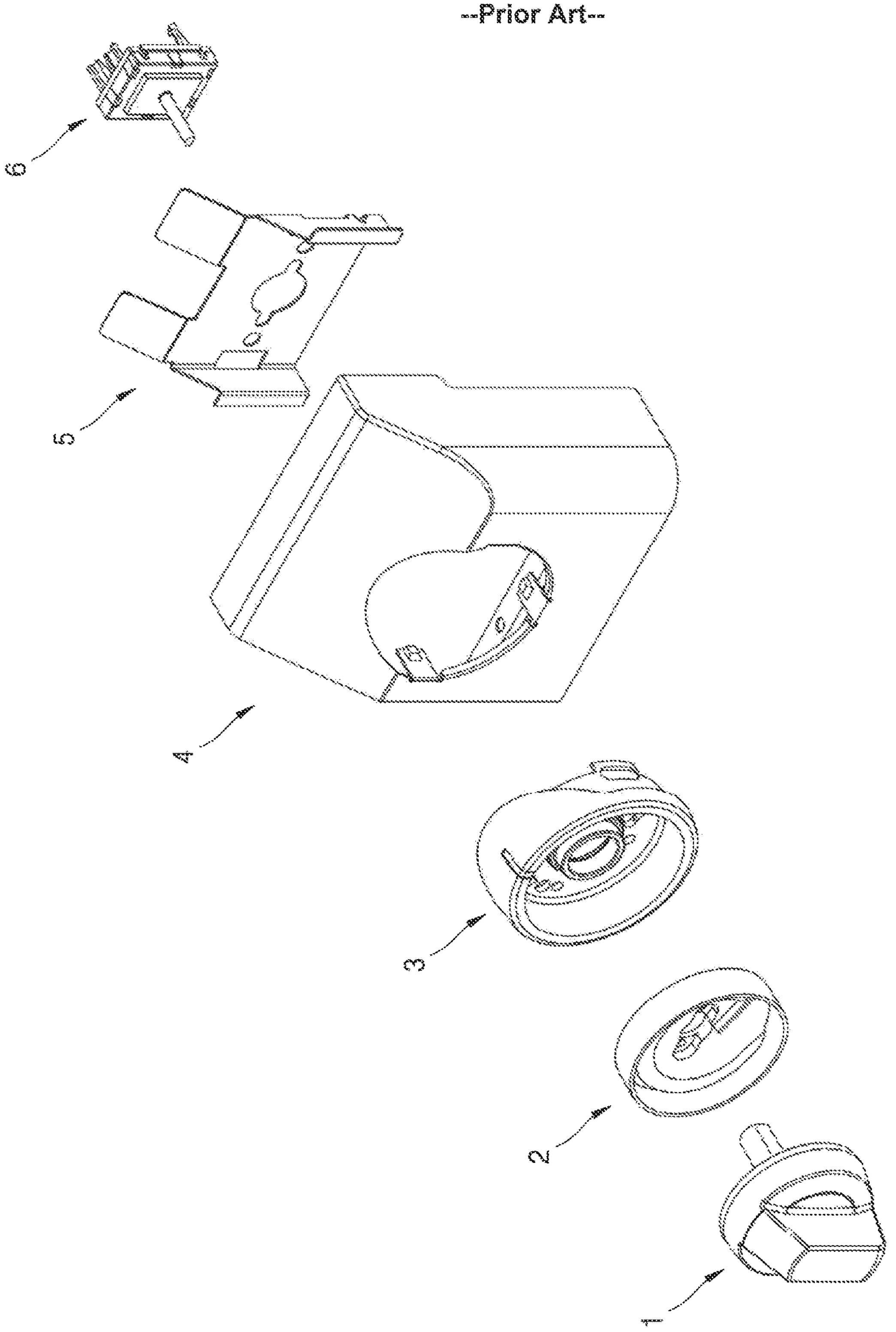
FIGS. 1 and 2 are diagrams illustrating a switch assembly in a conventional cooktop.
Figure 2:
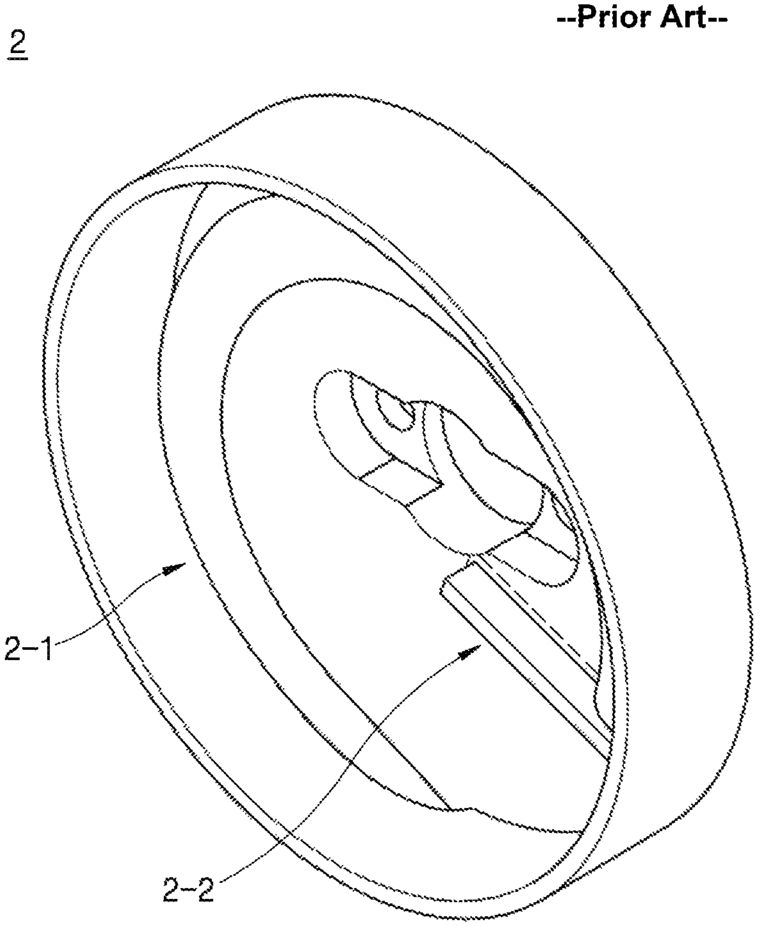
Figure 3:
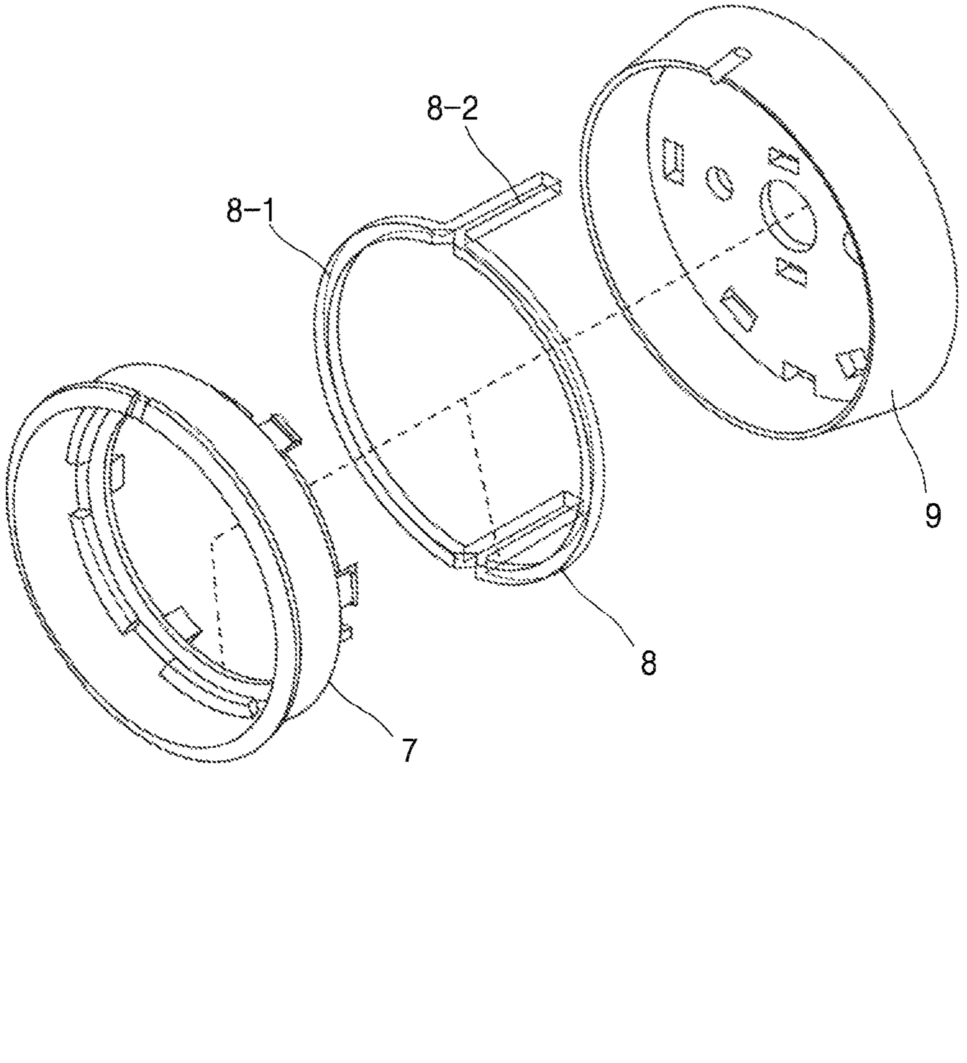
FIG. 3 is a diagram illustrating a portion of a knob assembly in another conventional cooktop.
Figure 4:
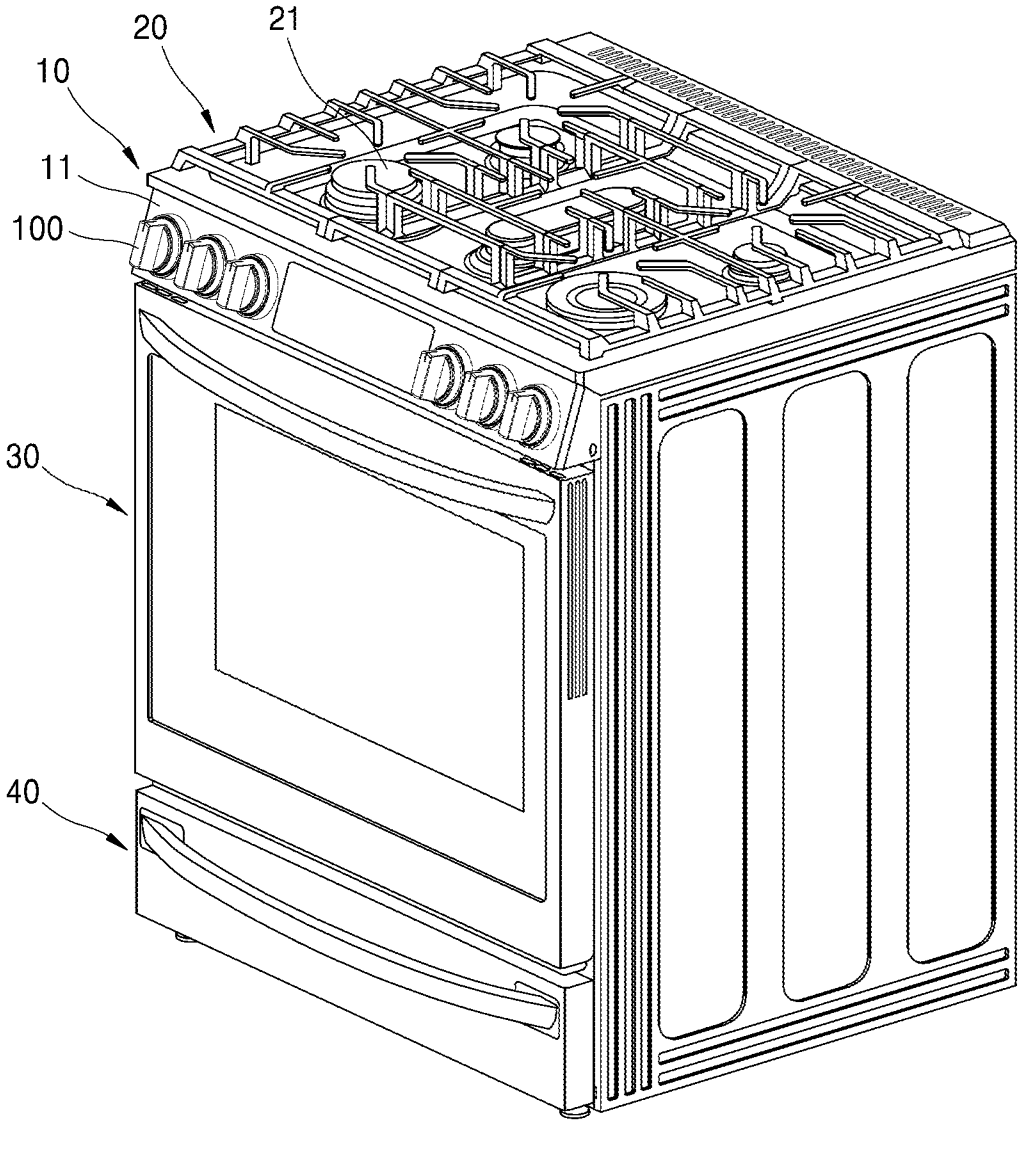
FIG. 4 is a diagram illustrating an exemplary cooktop provided with a knob assembly.

FIG. 4 is a diagram illustrating a view of an exemplary cooktop provided with a knob assembly. The cooktop can include a manipulating part 10 and a heating part, and the heating part can include a cooktop part 20, an oven part 30, and a drawer 40.

Components for manipulating operations of the cooktop can be disposed at the manipulating part 10. For example, a knob assembly 100 can be disposed at the manipulating part 10, and the knob assembly 100 can rotate around a rotation shaft that extends in a front-rear direction to adjust a thermal power generated by each part (e.g., the cooktop part 20, the oven part 30 and the drawer 40) of the cooktop or to set an operation mode of each part of the cooktop. The knob assembly 100 can be fixed to a control panel 11 of the manipulating part 10.

The cooktop part 20 can be disposed at an upper portion of the cooktop. The cooktop part 20 can include at least one of cooktop burners 21. The cooktop burner 21 can heat a vessel containing a target object or directly heat a target object to cook the target object using a flame that is produced by burning gases.

The oven part 30 can be disposed in a central portion of the cooktop. The oven part 30 can include a main body forming a cooking space in which a food item is cooked, and a burner assembly for cooking a target object accommodated in the cooking space. Additionally, the oven part 30 can include a door for opening and closing the cooking space.

The drawer 40 can slide into the cooktop or can be withdrawn from the cooktop and can keep a vessel containing a target object and the like at a predetermined temperature.

In FIG. 4, the cooktop includes the oven part, the cooktop part, and the drawer as a heating part for heating a target object, for example. However, the cooktop, in some implementations, may exclude some of the oven part, the cooktop part, and the drawer.

FIG. 4 shows a gas oven including the oven part, the cooktop part, and the drawer, which are capable of cooking a target object, as an example of the cooktop. But the subject matter of the present disclosure may be applied to various types of cooktops such as a cooktop that generates heat using electricity rather than gas or an oven and the like. For example, the cooktop part of the cooktop can include an induction heater capable of inductively heat a vessel and/or an electric heater capable of generating heat using electricity.

Hereinafter, the front denotes a front-surface direction of the cooktop, and the rear denotes a rear-surface direction of the coking appliance.

Figure 5:
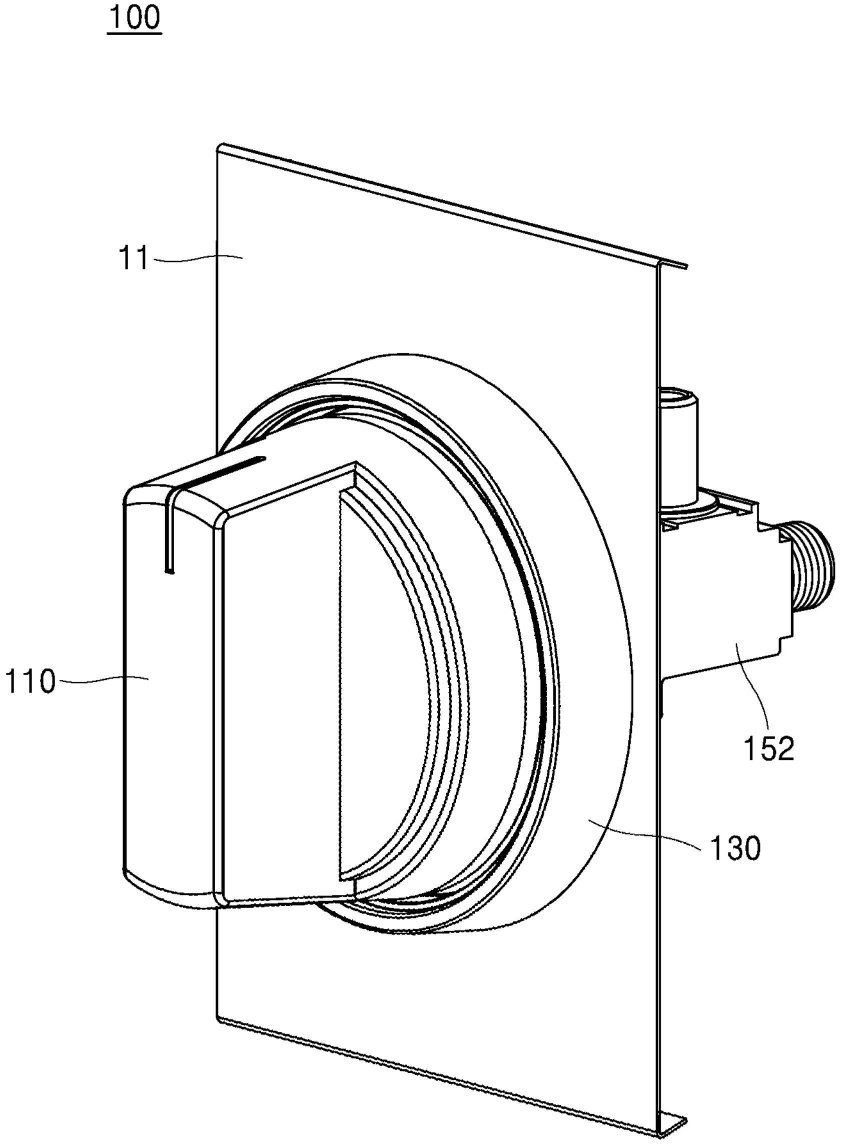
FIG. 5 is a diagram illustrating a perspective view of the knob assembly.
Figure 6:
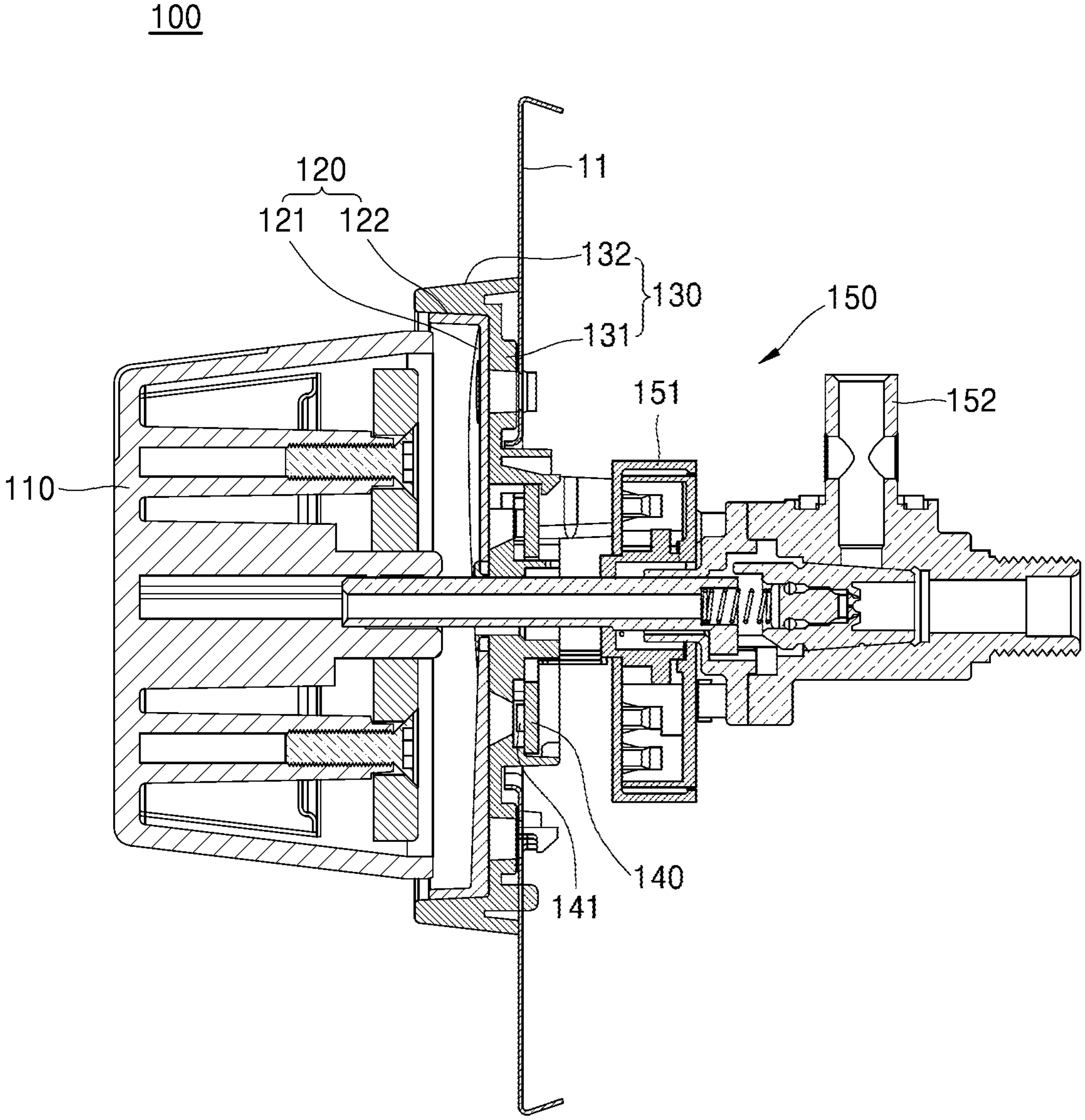
FIG. 6 is a diagram illustrating a cross-sectional view of the knob assembly in FIG. 5.
Figure 7:
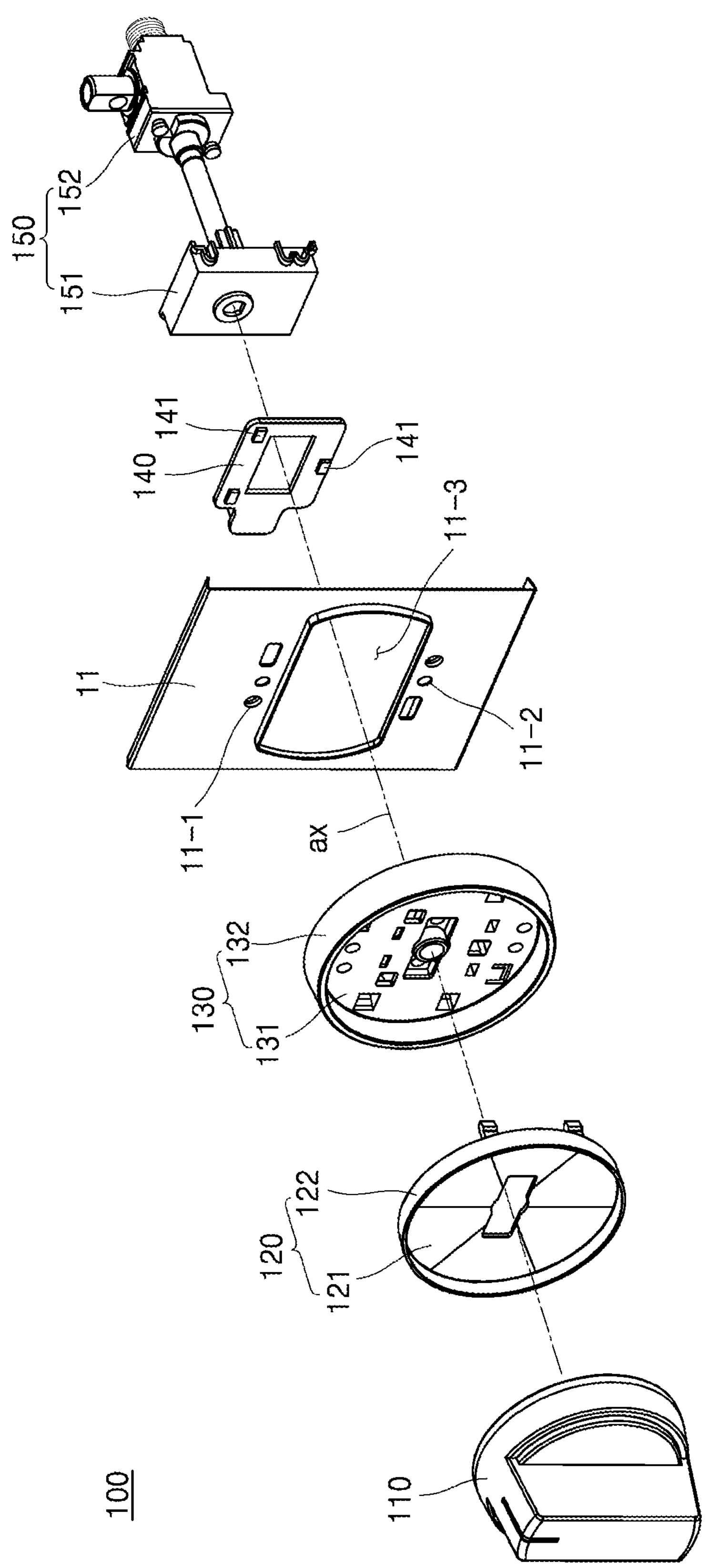
FIG. 7 is a diagram illustrating an exploded perspective view of the knob assembly in FIG. 5.

FIG. 5 is a diagram illustrating a perspective view of the knob assembly, FIG. 6 is a diagram illustrating a cross-sectional view of the knob assembly in FIG. 5, and FIG. 7 is a diagram illustrating an exploded perspective view of the knob assembly in FIG. 5.

The knob assembly 100 can include a knob body 110, a light diffusing part 120, a knob ring 130, a light source part 140, and an adjusting part 150, and the adjusting part 150 can include an ignition switch 151 and a valve 152.

The knob body 110 can define an exterior of a front surface of the knob assembly 100. The knob body 110 can be formed into a single component based on integration, or can be comprised of a plurality of components based on coupling. The knob body 110 can rotate around a rotation shaft ax that extends in the front-rear direction. For example, the knob body 110 can be rotatably coupled to the light diffusing part 120, the knob ring 130, the light source part 140, and the adjusting part 150.

The light diffusing part 120 can be disposed between the knob body 110 and the light source part 140. The light diffusing part 120 can be entirely short and formed into a cylinder having a front surface that is completely open. The light diffusing part 120 can emit light around the knob body 110. Additionally, the light diffusing part 120 can be fixed to an inside of the knob ring 130 and protect the light source part 140.

The light diffusing part 120 may be made of a material capable of diffusing light, irradiated from the light source part 140, therein. For example, the light diffusing part 120 may be made of an opaque plastic material. Accordingly, uniformity in brightness of light emitted around the knob body 110 can be improved.

Further, a position of the light diffusing part 120, which corresponds to a position of the light source of the light source part 140, can be thicker than another position of the light diffusing part 120. Thus, the uniformity in the brightness of the light emitted around the knob body 110 can be improved, and the brightness of the light can increase.

The knob ring 130 can be disposed at a rear side of the light diffusing part 120. For example, the knob ring 130 can be disposed between the light diffusing part 120 and the light source part 140. The knob ring 130 can be short entirely and formed into a cylinder having a front surface that is completely open. Additionally, the knob ring 130 can fix the light source part 140. Further, the knob ring 130 can be disposed at a front surface of the control panel 11 and form the exterior of the knob assembly 100.

The knob ring 130 may be made of an opaque material. A surface of the knob ring 130 can be plated and/or coated and fix the light source part 140.

The light diffusing part 120 and the knob ring 130 can be fixed to the control panel 11 in a state of being coupled to each other.

The light source part 140 can be disposed at the rear side of the light diffusing part 120. The light source part 140 can include at least one of light sources 141 configured to irradiate light to a rear surface of the light diffusing part 120. The light source 141 may be a light-emitting diode. When a plurality of light sources 141 is provided, the plurality of light sources 141 can be spaced at regular intervals.

The light source part 140 can be fixed to the knob ring 130 disposed at the rear of the light diffusing part 120. For example, the light diffusing part 120 can be fixed to an inside of the front surface of the knob ring 130, and the light source part 140 can be fixed to a rear surface of the knob ring 130.

The adjusting part 150 can adjust thermal power output from the cooktop, or adjust operation of the cooktop such as a mode of the cooktop and the like, based on the rotation of the knob body 110. When the cooktop uses gas as a heat source, the adjusting part 150 can include an ignition switch 151 or a valve 152.

The ignition switch 151 can receive torque of the knob body 110. An on/off state of the ignition switch 151 can change based on a rotation angle of the knob body 110. The ignition switch 151 can be turned on and produce a spark on a fire mouth of a burner (21 in FIG. 4)/a spark on a burner (21 in FIG. 4) when the knob body 110 makes a rotation at a predetermined angle.

The valve 152 can receive torque from the knob body 110. An opening degree of the valve 152 can be determined based on a rotation degree of the knob body 110. In some implementations, the valve 152 can receive torque from the knob body 110 only when the knob body 110 rotates in a state of being pressed.

The ignition switch 151 and the valve 152 can receive torque of the knob body 110 through a valve shaft.

The control panel 11 can be disposed at a rear side of the knob ring 130. As described above, the light diffusing part 120 and the knob ring 130 can be fixed to the control panel 11 in the state of being coupled to each other. The control panel 11 can be a portion (e.g., a front surface of the cooktop part 10 in FIG. 4) of the cooktop or a portion of the knob assembly 100. The control panel 11 can have an opening 11-3 at which the light source part 140 is disposed. Additionally, the control panel 11 can have at least one of panel holes 11-1 and 11-2 through which the knob ring 130 is coupled to the control panel 11.

Figure 8:
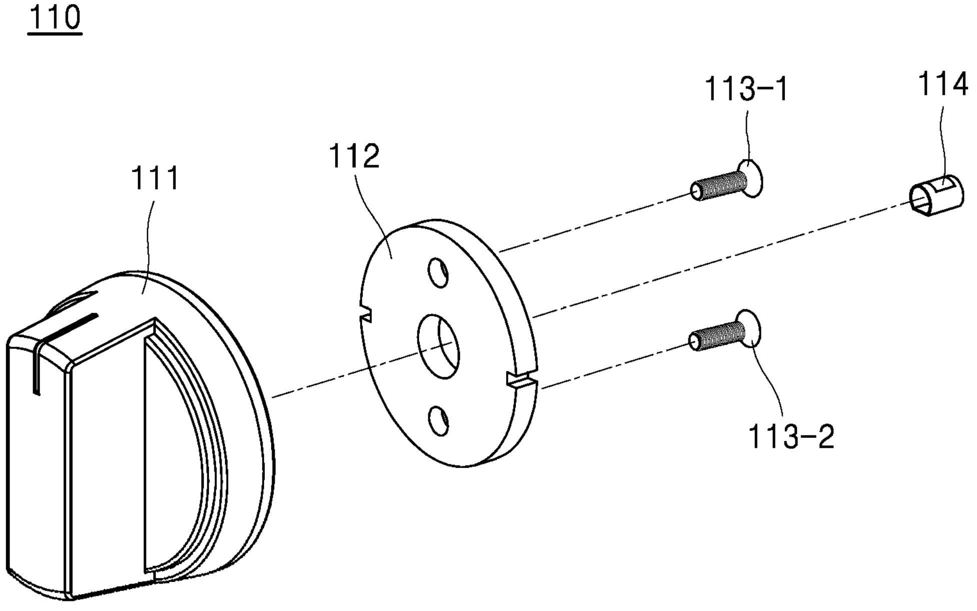
FIG. 8 is a diagram illustrating an exploded perspective view of an example of a knob body of the knob assembly.

FIG. 8 is a diagram illustrating an exploded perspective view of an exemplary knob body 110 of the knob assembly 100. The knob body 110 can include a knob 111, an insert 112, screw bolts 113-1 and 113-2, and a spring 114.

The knob 111 can form the exterior of the front surface of the knob assembly 100. The knob 111 can include a cylindrical body and a handle protruding forward from the body.

The insert 112 can be inserted into a rear surface of the knob 111. The insert 112 can improve rigidity of the knob 111 and limit deformation of the knob 111. The insert 112 may have a shape of doughnut.

The screw bolts 113-1 and 113-2 can fix the insert 112 and the knob 111.

The spring 114 can be disposed inside the knob body 110, and can connect between the knob 111 and the valve shaft.

Figure 9:
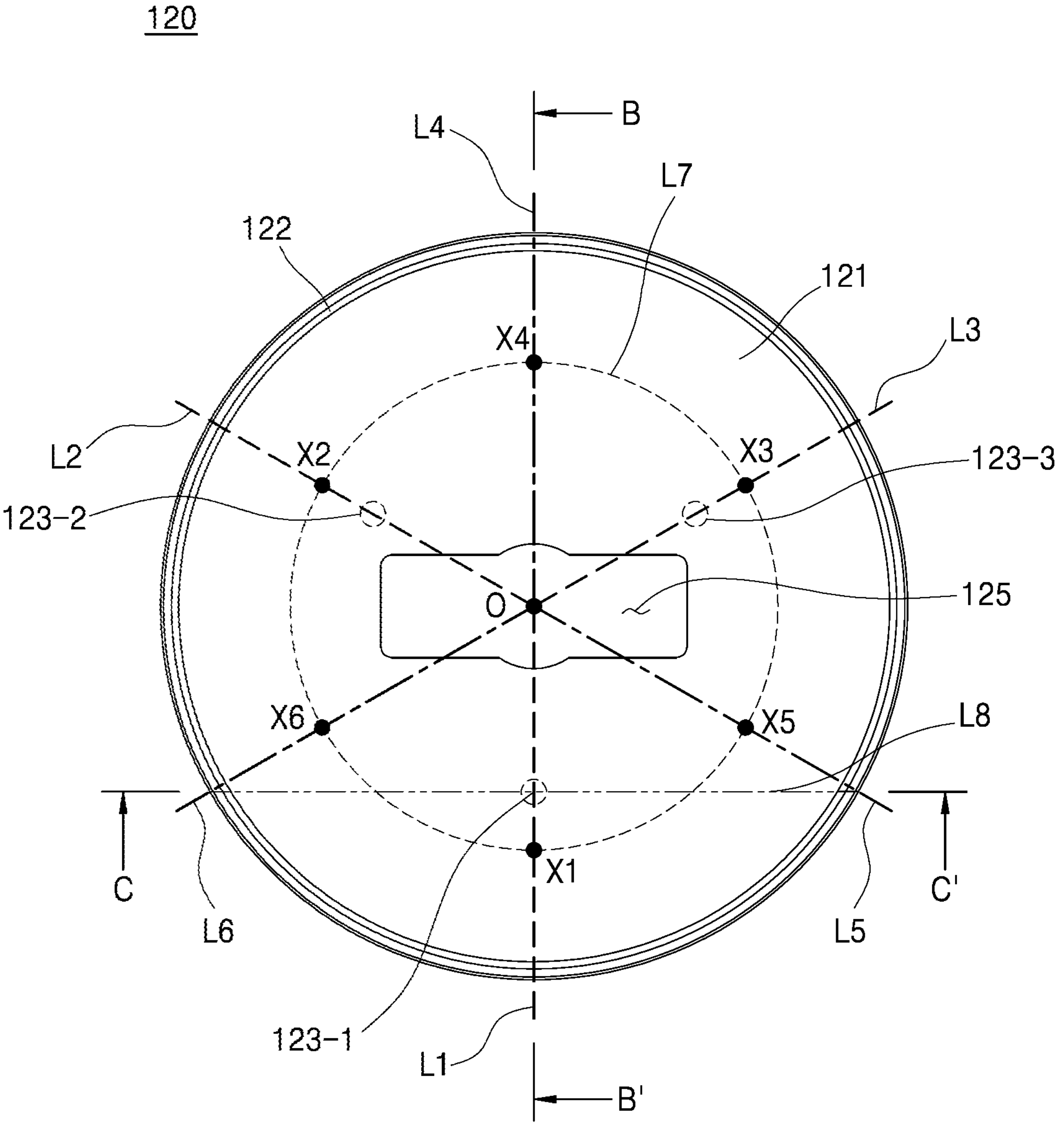
FIG. 9 is a diagram illustrating a light diffusing part of the knob assembly viewed from a front.
Figure 10:
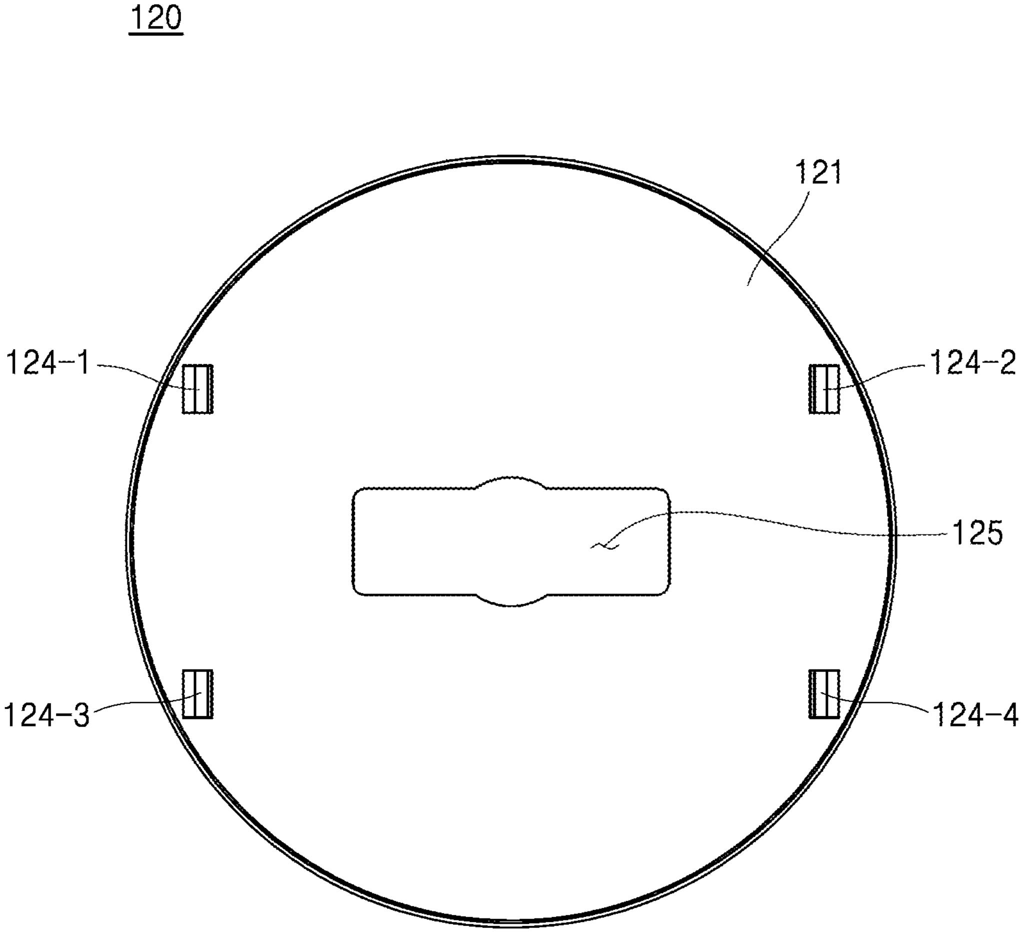
FIG. 10 is a diagram illustrating the light diffusing part of the knob assembly viewed from a rear.
Figure 11:
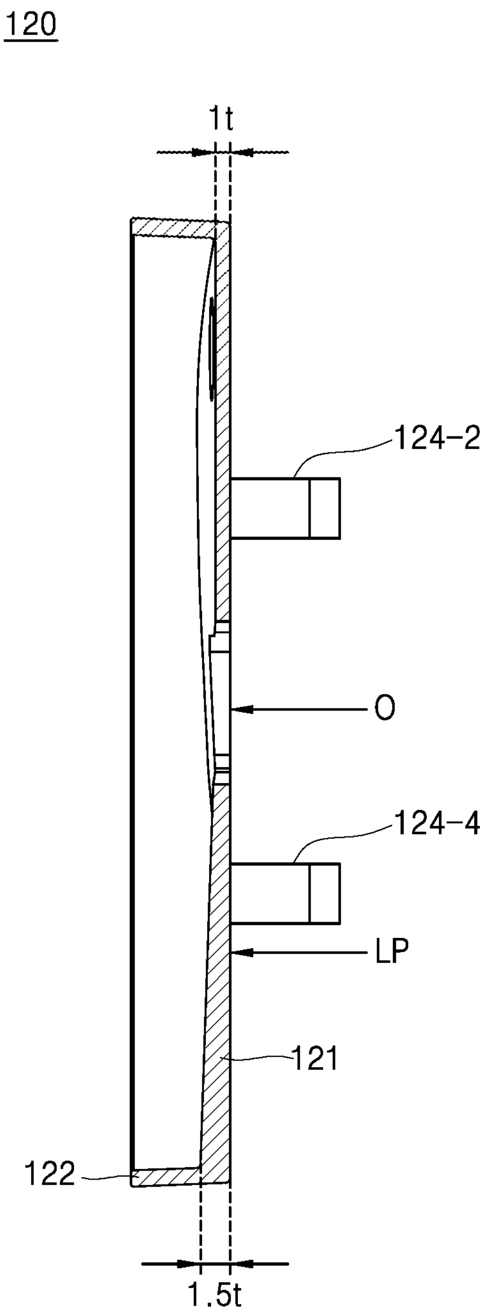
FIG. 11 is a diagram illustrating a cross-sectional view of a light diffusing part cut along line B-B' in FIG. 8.
Figure 12:
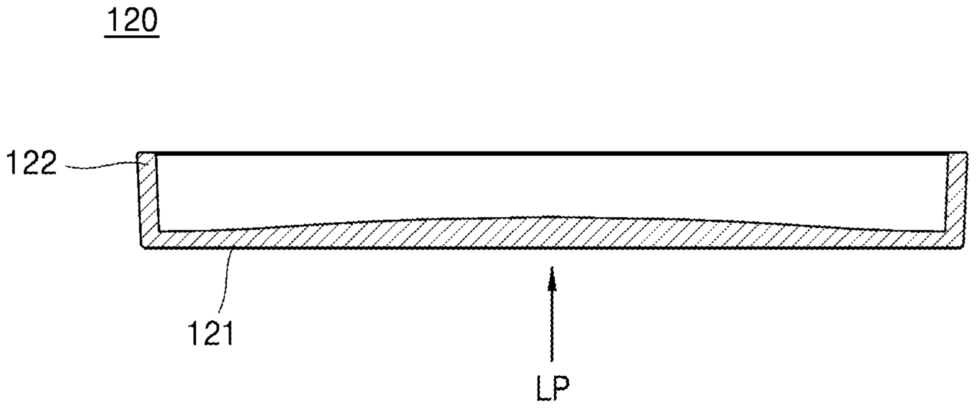
FIG. 12 is a diagram illustrating a cross-sectional view of a light diffusing part cut along line C-C' in FIG. 8.

FIG. 9 is a diagram illustrating a view of a light diffusing part 120 of the knob assembly 100 viewed from a front, FIG. 10 is a diagram illustrating a view of the light diffusing part 120 of the knob assembly 100 viewed from a rear, FIG. 11 is a diagram illustrating a cross-sectional view of a light diffusing part 120 cut along line B-B' in FIG. 9, and FIG. 12 is a diagram illustrating a cross-sectional view of a light diffusing part 120 cut along line C-C' in FIG. 9.

The light diffusing part 120 can include a first plate 121 formed into a flat plate, and a first ring 122 surrounding an outer edge of the first plate 121 and protruding forward from the first plate 121. For example, the light diffusing part 120 can have a cylindrical shape entirely as a result of coupling between the first plate 121 and the first ring 122. The first ring 122 can have a diameter greater than a diameter of the knob body (110 in FIG. 7). At least a portion of the knob body (110 in FIGS. 7 and 8) can be inserted into a space formed by the first plate 121 and the first ring 122. For example, the first ring 122 can be disposed in a way that an edge of a front surface of the first ring 122 is seen, when the knob assembly 100 is viewed from the front. Thus, a user may directly see light diffused through the light diffusing part 120, resulting in improvement in visibility.

In FIG. 9, reference numerals 123-1, 123-2, and 123-3 indicate light source corresponding parts of the light diffusing part 120, corresponding to the positions of the light sources 141, when the light source part (140 in FIGS. 6 and 7) is fixed to the knob ring (130 in FIGS. 6 and 7). For example, the light source corresponding parts 123-1, 123-2, and 123-3 of the light diffusing part 120 can be points corresponding to forward directions of the light sources 141.

An average thickness of the first plate 121 on straight lines (L1, L2 and L3 in FIG. 9) passing from a center O of the first plate 121 through the light source corresponding parts 123-1, 123-2, and 123-3 may be greater than a thickness of another portion of the first plate 121. Additionally, on the straight lines (L1, L2, and L3 in FIG. 8), the thickness of the first plate 121 can increase from the center O toward an outer edge of the first plate 121. The center O of the first plate 121 can be aligned with the rotation shaft (ax in FIG. 7).

In the case of a first plate 121 made of a material capable of diffusing light, when light is irradiated to any one point of the first plate 121, the light tends to be diffused to a direction in which a thickness of the first plate 121 increases rather than a direction in which the thickness of the first plate 121 decreases. In some implementations, the first plate 121 can have a thickness that increases from the center O of the first plate 121 toward the outer edge thereof. Specifically, the thickness of the first plate 121 can increase from the center O of the first plate 121 toward the outer edge thereof on the straight lines L1, L2, L3, and light can be irradiated to one point of the straight lines L1, L2, L3. Accordingly, the light irradiated to the first plate 121 can be smoothly diffused in a direction of the outer edge of the first plate 121, and the light irradiated to the first plate 121 can be efficiently diffused toward an outer edge area of the first plate 121. The light diffused to the outer edge area of the first plate 121 can be diffused to an edge of the front surface of the first ring 122 and as a result, can become brighter on the front surface of the first ring 122. Further, the light diffused through the first plate 121 and the first ring 122 can be seen on the front surface of the knob assembly 100. Thus, uniformity in brightness of the light can be ensured on the front surface of the first ring 122.

On straight lines (L4, L5, and L6 in FIG. 9) passing from the center O of the first plate 121 through intermediate points between the light sources 141, the first plate 121 can have a uniform thickness.

The first plate 121 can have a first plate hole 125, thereon. In some implementations, the valve shaft can extend in the front-rear direction through the first plate hole 125, and torque of the knob body (110 in FIG. 7) can be delivered to the adjusting part (150 in FIG. 7) through the valve shaft.

Referring to FIG. 10, a plurality of coupling hooks 124-1, 124-2, 124-3, and 124-4 extended rearward from the first plate 121 can be disposed at a rear surface of the first plate 121. The plurality of first coupling hooks 124-1, 124-2, 124-3, and 124-4 can be fitted-coupled to the first coupling holes (134-1, 134-2, 134-3, and 134-4 in FIG. 13) formed at the knob ring (130 in FIG. 7). Accordingly, the light diffusing part 120 and the knob ring 130 can be readily coupled to each other without an additional component.

The term "fitted-coupled" may refer that the light diffusing part 120 and the knob ring 130 are jointed by the first coupling hooks 124-1 to 124-4 being inserted into the first connecting holes 134-1 to 134-4 with a certain force so that the first coupling hooks 124-1 to 124-4 are caught in the first connecting holes 134-1 to 134-4.

In FIGS. 11 and 12, LP indicates a position at which the light source 141 is disposed, and can be a position corresponding to the light source corresponding part 123-1 in FIG. 9.

Referring to FIGS. 9 and 11, the thickness of the light diffusing part 120, on the straight line (i.e., L1, L2 and L3 in FIG. 9) that passes from the center O of the light diffusing part 120 (specifically, the center O of the first plate 121) through the light source corresponding part 123-1, 123-2, and 123-3, can be greater than the thickness of the light diffusing part 120 on the straight line that does not pass through the light source corresponding part 123-1, 123-2, and 123-3. The increase in the thickness of the light source corresponding part 123-1, 123-2, and 123-3 of the light diffusing part 120 may result in the enhanced diffusion of light.

In some implementations, the thickness of the light diffusing part 120 on the straight line (i.e., L4, L5 and L6 in FIG. 9) that connects a position (exactly, an intermediate point between adjacent light sources among a plurality of light sources), at which the light source 141 is not disposed, with the center O of the light diffusing part 120 (specifically, the center of the first plate 121) can be less than the thickness of the light diffusing part 120 on the straight line that does not pass through the intermediate point. Thus, light can be diffused in a desired direction.

In some implementations, on the straight line (L1, L2, and L3 in FIG. 9) connecting the light source corresponding part (a point of the light diffusing part 120, corresponding to LP; 123-1 in FIG. 9) with the center O of the light diffusing part 120 (specifically, the center of the first plate 121), the thickness of the light diffusing part 120 (specifically, the first plate 121) can increase from the center O of the first plate 121 toward the outer edge thereof. With the structure, light irradiated from the light source 141 can be diffused to the outer edge of the light diffusing part 120 (specifically, the first plate 121), and as a result, can be uniformly emitted through the end of the light diffusing part 120 (specifically, the first ring 122) outward.

In some implementations, on straight lines except for the straight lines (L4, L5, and L6 in FIG. 9) connecting the center O of the light diffusing part 120 with the intermediate point between adjacent light sources, among the straight lines extending from the center of the light diffusing part 120 to the outer edge of the light diffusing part 120, the thickness of the light diffusing part can increase from the center O toward the outer edge. In some implementations, an average thickness of the light diffusing part 120, on the straight line (i.e., L1, L2, and L3 in FIG. 9) that passes from the center O of the light diffusing part 120 through the light source corresponding part 123-1, 123-2, and 123-3, can be greater than an average thickness of the light diffusing part 120 on the straight line that does not pass through the light source corresponding part 123-1, 123-2, and 123-3.

In some implementations, the thickness of the light diffusing part 120 (specifically, the first plate 121) can remain constant on the straight lines (L4, L5, and L6 in FIG. 9) connecting the center O of the light diffusing part 120 with the intermediate point between light sources. In some implementations, the thickness of the light diffusing part 120 on the straight line (L4, L5, and L6 in FIG. 9) can be smallest among the thicknesses of the light diffusing part 120.

Under the assumption that the thickness of the light diffusing part 120 (specifically, the first plate 121) is t, at a position (exactly, intermediate positions among a plurality of light sources) of the light diffusing part 120, where the light source 141 is not disposed, a maximum thickness of the light diffusing part 120 (specifically, the first plate 121) can be about 1.4 t to 1.6 t, preferably, 1.5 t, on the straight line connecting the light source corresponding part (a point of the light diffusing part 120, corresponding to LP; 123-1 in FIG. 9) with the center O of the light diffusing part 120 (specifically, the center of the first plate 121).

Referring to FIGS. 9, 11 and 12, on a circumference of a virtual circle (e.g., L7 in FIG. 9) having any radius from the center O of the light diffusing part 120 (specifically, the center O of the first plate 121), the thickness of the light diffusing part can decrease as farther from an intersection point X1, X2, and X3 between the straight lines (L1, L2 and L3 in FIG. 9) connecting the center O of the light diffusing part 120 with the light source corresponding part 123-1, 123-2, 123-3 and the virtual circle (e.g., L7 in FIG. 9). Additionally, on the circumference of the virtual circle (e.g., L7 in FIG. 9) having any radius from the center O of the light diffusing part 120 (specifically, the center O of the first plate 121), the thickness of the light diffusing part can increase as farther from an intersection point X4, X5, and X6 between the straight lines (L4, L5, and L6 in FIG. 9) connecting the center O of the light diffusing part 120 with the intermediate points among adjacent light sources and the virtual circle (e.g., L7 in FIG. 9).

For example, on the circumference of the virtual circle (e.g., L7 in FIG. 9) having any radius from the center O of the light diffusing part 120, the thickness of the light diffusing part 120 can decrease from the intersection point X1, X2, and X3 between the straight lines (L1, L2 and L3 in FIG. 9) connecting the center O of the light diffusing part 120 with the light source corresponding part 123-1, 123-2, and 123-3 and the virtual circle (e.g., L7 in FIG. 9) toward the intersection point X4, X5, and X6 between the straight lines (L4, L5, and L6 in FIG. 9) connecting the center O of the light diffusing part 120 with the intermediate points among adjacent light sources and the virtual circle (e.g., L7 in FIG. 9).

For example, in the light diffusing part 120 of the knob assembly 100, the thickness of the portion in which the light source is disposed, and the thickness on the straight lines (L1, L2 and L3 in FIG. 9) passing through the center of the light diffusing part 120 can be greater than the thickness of the portion in which the light source is not disposed and the thickness on the straight lines (L4, L5, and L6 in FIG. 9) passing through the center O of the light diffusing part 120. The portion having the greater thickness may have a sector shape, when viewed from the front.

Referring to FIGS. 9 and 12, on a straight line (e.g., L8 in FIG. 9) across the straight line (L1, L2 and L3 in FIG. 9) passing through the center O of the light diffusing part 120 and the light source corresponding part 123-1, 123-2, and 123-3, the thickness of the light diffusing part 120 can decrease as farther from the straight line (L1, L2 and L3 in FIG. 9). In some implementations, the straight line (L8 in FIG. 9) can be a straight line passing through the light source corresponding part (123-1 in FIG. 9). Accordingly, light irradiated from the light source 141 can be uniformly diffused to the front surface of the first ring 122 of the light diffusing part 120.

Figure 13:
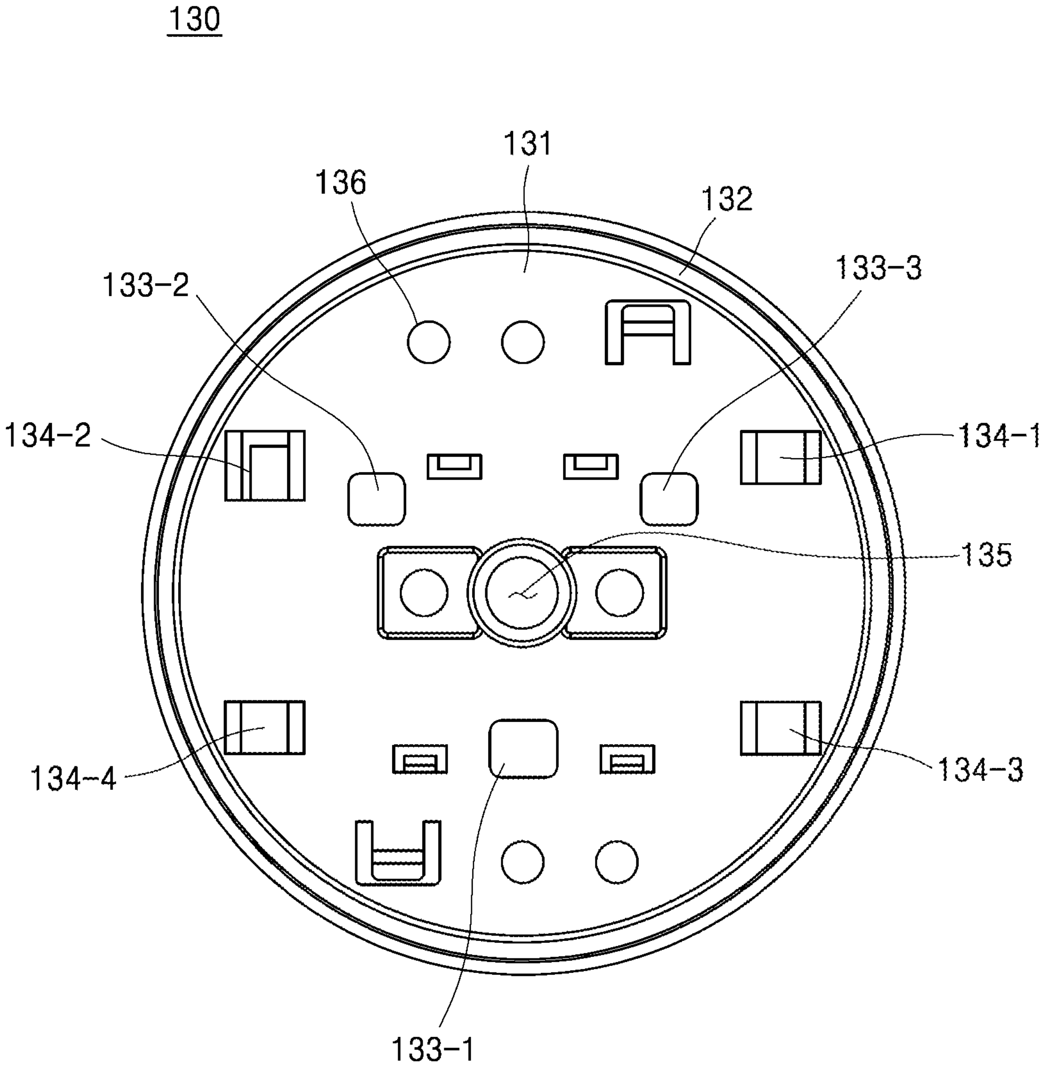
FIG. 13 is a diagram illustrating a view of a knob ring of the knob assembly viewed from the front.
Figure 14:
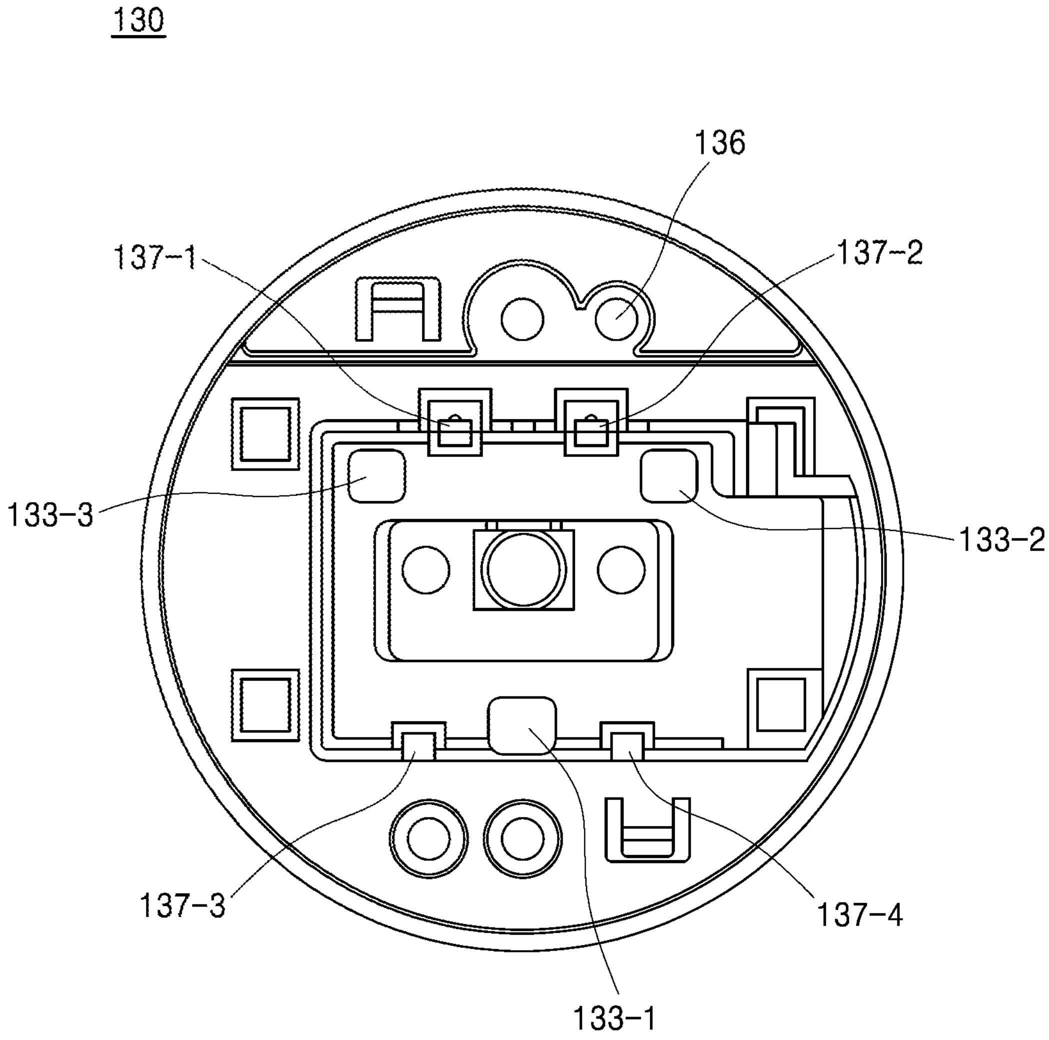
FIG. 14 is a diagram illustrating a view of the knob ring of the knob assembly viewed from the rear.
Figure 15:
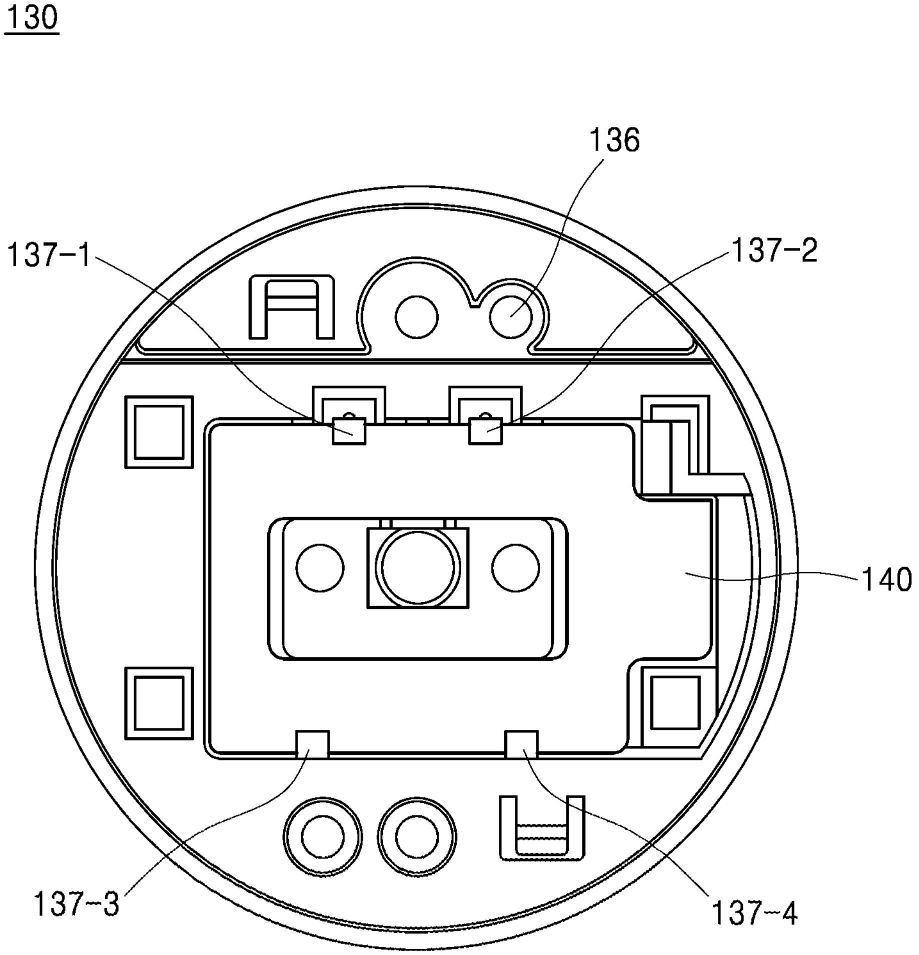
FIG. 15 is a diagram illustrating a view of a knob ring coupled with a light source part in the knob assembly viewed from the rear.

FIG. 13 is a diagram illustrating a view of a knob ring 130 of the knob assembly 100 viewed from the front, FIG. 14 is a diagram illustrating a view of the knob ring 130 of the knob assembly 100 viewed from the rear, and FIG. 15 is a diagram illustrating a view of a knob ring 130 coupled with a light source part 140 in the knob assembly 100 viewed from the rear.

Referring to FIG. 13, like the light diffusing part 120, the knob ring 130 can be short entirely and formed into a cylinder. For example, the knob ring 130 can include a second plate 131, and a second ring 132 surrounding an outer edge of the second plate 131 and protruding forward from the second plate 131. The second ring 132 can form the exterior of the knob assembly. The second ring 132 can have a diameter greater than the diameter of the first ring 122 of the light diffusing part 120.

The light diffusing part 120 can be inserted into and fixed to the knob ring 130, i.e., a space formed by the second plate 131 and the second ring 132. For example, first coupling holes 134-1, 134-2, 134-3, and 134-4 can be formed on the second plate 131 of the knob ring 130. The first coupling hooks 124-1, 124-2, 124-3, and 124-4 formed at the light diffusing part 120 can be fitted-coupled respectively to the first coupling holes 134-1, 134-2, 134-3, and 134-4.

As illustrated in FIG. 6, a height of the first ring 122 can be less than a height of the second ring 132. Accordingly, light emitted through the first ring 122 of the light diffusing part 120 can be limited from excessively escaping from a direction facing the front.

Additionally, the light source (141 in FIG. 7) of the light source part (140 in FIG. 7) can be disposed on the second plate 131, and a plurality of light transmitting holes 133-1, 133-2, and 133-3 through which light irradiated from the light source (141 in FIG. 7) can be formed on the second plate 131.

A through hole 135 can be formed in a central portion of the second plate 131. The valve shaft of the valve 152 can pass through the through hole 135.

Referring to FIGS. 14 and 15, a plurality of second coupling hooks 137-1, 137-2, 137-3, and 137-4 for fixing the light source part (140 in FIG. 7) can be disposed at the rear surface of the knob ring 130. The light source part (140 in FIG. 7) can be fixed to the plurality of second coupling hooks 137-1, 137-2, 137-3, and 137-4 in a way that the light source part is fitted-coupled to the plurality of second coupling hooks. For example, the light source part (140 in FIG. 7) can be disposed at the rear surface of the knob ring 130, and then a proper pressure may be applied forward, such that the light source part (140 in FIG. 7) is fitted-coupled and fixed to the second coupling hooks 137-1, 137-2, 137-3, and 137-4.

Since the light source part 140 is directly coupled to the knob ring 130 without being coupled to the control panel 11 or the adjusting part 150, a twist of the light source part 140 can be limited even when the knob body 110 rotates, and the light source part 140 can be readily assembled and replaced.

Further, a plurality of coupling holes 136 can be formed on the second pate 131 of the knob ring 130. The knob ring 130 can be coupled to the control panel (11 in FIG. 7) through the coupling holes 136. For example, the coupling holes 136 can be aligned with the panel holes 11-1 and 11-2 of the control panel (11 in FIG. 7), and a bolt and the like can be fastened to the aligned coupling hole 136 and panel hole 11-1 and 11-2, such that the knob ring 130 is fixed to the control panel (11 in FIG. 7).

Figure 16:
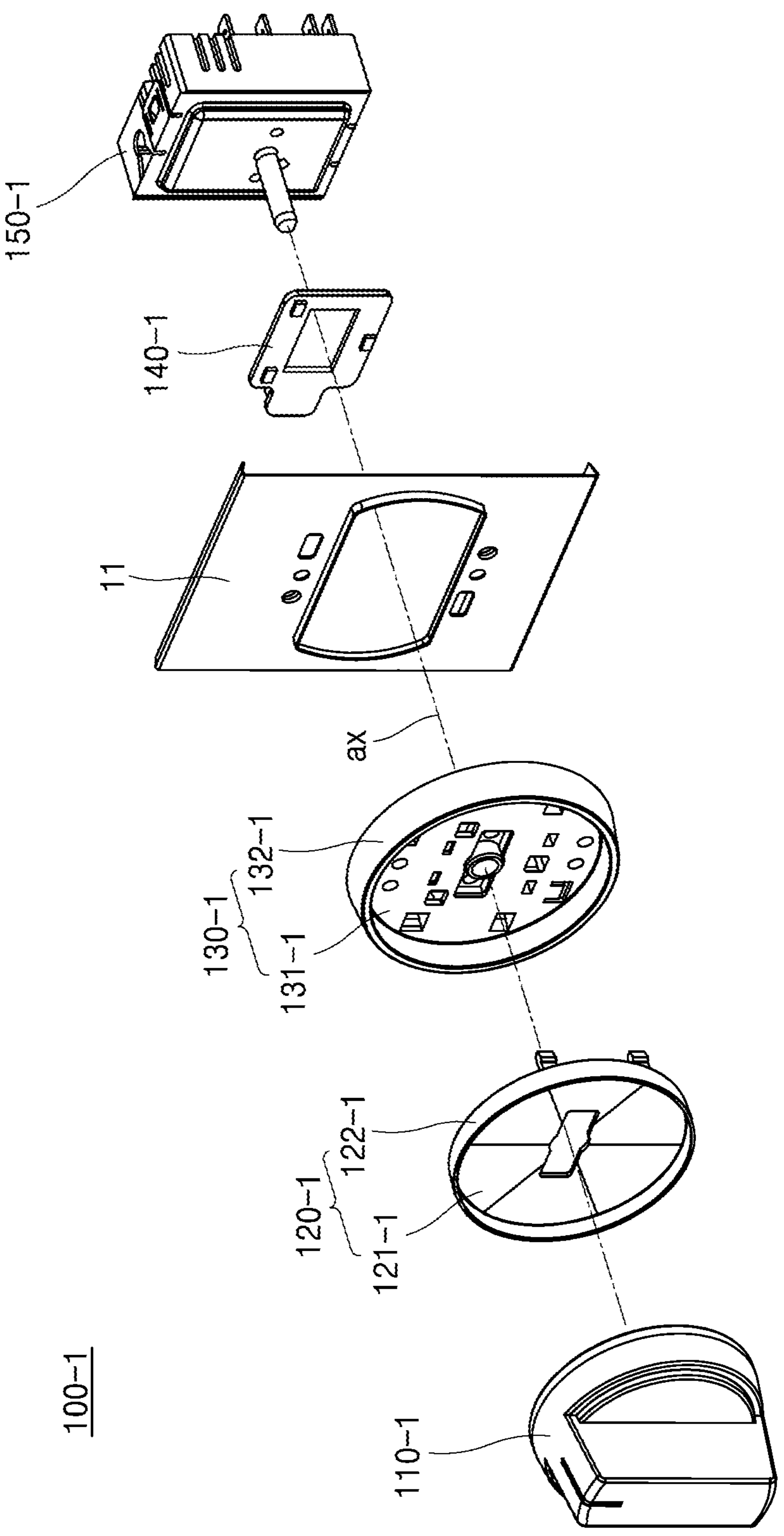
FIG. 16 is a diagram illustrating an exploded perspective view of another exemplary knob assembly.

FIG. 16 is a diagram illustrating an exploded perspective view of another exemplary knob assembly 100-1. The knob assembly 100-1 can include a knob body 110-1, a light diffusing part 120-1, a knob ring 130-1, a light source part 140-1, and an adjusting part 150-1. The adjusting part 150-1 can be a rotary switch. In FIG. 15, reference numeral 11 indicates the control panel, 121-1 indicates the first plate, 122-1 indicates the first ring, 131-1 indicates the second plate, and 132-1 indicates the second ring.

The knob body 110-1, the light diffusing part 120-1, the knob ring 130-1, and the light source part 140-1 can be respectively the same as the knob body 110, the light diffusing part 120, the knob ring 130, and the light source part 140 that are described with reference to FIGS. 7 to 14.

For example, the knob assembly 100-1 in FIG. 15 is the same as the knob assembly 100 described with reference to FIG. 7 and the like except that the adjusting part 150-1 is a rotary switch. When the cooktop inductively heats a vessel or when the cooktop adopts an electric heater and the like using electricity to generate heat, a rotary switch may be applied instead of the adjusting part comprised of the ignition switch and the valve.

The invention claimed is:

1. A cooktop, comprising:

a heating part configured to heat a target object; and a manipulating part comprising (i) a control panel and (ii) a knob assembly that is coupled to the control panel and that is configured to control the heating part, wherein the knob assembly includes:

a knob body that is disposed at a front surface of the control panel and that is configured to rotate with respect to a rotation shaft extended in a front-rear direction, a light diffusing part that is disposed at a rear side of the knob body and that is configured to diffuse light, and a light source part that is disposed at a rear side of the light diffusing part and that includes one or more light sources, and wherein the light diffusing part comprises:

a base having a thickness that increases from a center of the base toward an outer edge of the base along a first straight line that passes through a center of the light diffusing part, and a rib that surrounds the outer edge of the base, that protrudes forward from the base, and that has a diameter greater than a diameter of the knob body.

2. The cooktop of claim 1, wherein the light diffusing part further comprises a light source corresponding part that is disposed at a position corresponding to one of the one or more light sources, and wherein the first straight line passes from a center of the base through the light source corresponding part.

3. The cooktop of claim 2, wherein a maximum thickness of the base along the first straight line is 1.5 times greater than a minimum thickness of the base.

4. The cooktop of claim 2, wherein a thickness of the base on a circumference of a first circle decreases from an intersection point between the first circle and the first straight line toward the outer edge of the base.

5. The cooktop of claim 2, wherein a thickness of the base along the first straight line is greater than a thickness of the base along a straight line that does not pass through the light source corresponding part.

6. The cooktop of claim 2, wherein the light source part comprises a plurality of light sources, and wherein a thickness of the base along a second straight line that passes from the center of the base through an intermediate point between two adjacent light source corresponding parts is less than a thickness of the base along a straight line that does not pass through the intermediate point.

7. The cooktop of claim 6, wherein the thickness of the base along the second straight line remains constant from the center of the base toward the outer edge of the base.

8. The cooktop of claim 6, wherein an outermost thickness of the base along the first straight line is 1.5 times greater than a thickness of the base along the second straight line.

9. The cooktop of claim 1, wherein a portion of the knob body is inserted into a space defined by the base and the rib.

10. The cooktop of claim 1, further comprising:

a knob ring that is disposed between the light diffusing part and the light source part, that is coupled to a front surface of the control panel, and that defines an exterior of the knob assembly.

11. The cooktop of claim 10, wherein:

the base comprises one or more first coupling hooks protruding rearward, and the knob ring comprises one or more first connecting holes fitted-coupled to the one or more first coupling hooks.

12. The cooktop of claim 11, wherein the knob ring comprises:

a plate having at least one of the one or more first connecting holes, and a ring that surrounds an outer edge of the plate, that protrudes forward from the plate, and that has a diameter greater than a diameter of the light diffusing part.

13. The cooktop of claim 12, wherein the light diffusing part is inserted into a space defined by the plate and the ring.

* * * * *